United States Patent [19]

Balazs et al.

[11] Patent Number: 4,641,607
[45] Date of Patent: Feb. 10, 1987

[54] MULTISTAGE EVAPORATION BOILING EQUIPMENT

[75] Inventors: Janos Balazs; Adam Bocskor; Otto Cseh; Rezso Iring, all of Budapest, Hungary

[73] Assignee: Energiagazdalkodasi Intezet, Budapest, Hungary

[21] Appl. No.: 760,992

[22] Filed: Jul. 31, 1985

[51] Int. Cl.$^4$ .............................................. F22B 37/22
[52] U.S. Cl. .................. 122/360; 122/209 R; 165/74; 165/145
[58] Field of Search .................. 122/13 R, 209 R, 223, 122/224, 234, 257, 360, 361, 21; 165/74, 143, 145

[56] References Cited

U.S. PATENT DOCUMENTS

| | | | |
|---|---|---|---|
| 1,640,746 | 8/1927 | Braun | 165/143 |
| 1,798,354 | 3/1931 | Ris | 165/143 |
| 1,813,057 | 7/1931 | Key | 165/143 |
| 1,918,608 | 7/1933 | Mahoney | 165/74 |
| 2,662,850 | 12/1953 | Kraft | 165/145 |
| 2,939,769 | 6/1960 | Webb | 165/145 |
| 4,254,826 | 3/1981 | Adams | 165/145 X |

FOREIGN PATENT DOCUMENTS 2830225  1/1980  Fed. Rep. of Germany ........ 165/74

Primary Examiner—Albert J. Makay
Assistant Examiner—Steven E. Warner
Attorney, Agent, or Firm—Karl F. Ross; Herbert Dubno

[57] ABSTRACT

A multistage evaporation boiling equipment is disclosed in the form of a single unit, each stage operating at a different pressure. Two or more bundle type heat exchanger units are horizontally positioned along a central column, part of which units protrude from the column. Attached to the protruding part of each unit is a flange which is covered by a sealing tube wall. A cover over a passageway communicating with this sealing tube wall provides a second seal. One or more walls inside the column separate the heat exchanger units. Openings, which may hold a choke means, are found in the separating wall to control passage of vapor.

4 Claims, 1 Drawing Figure

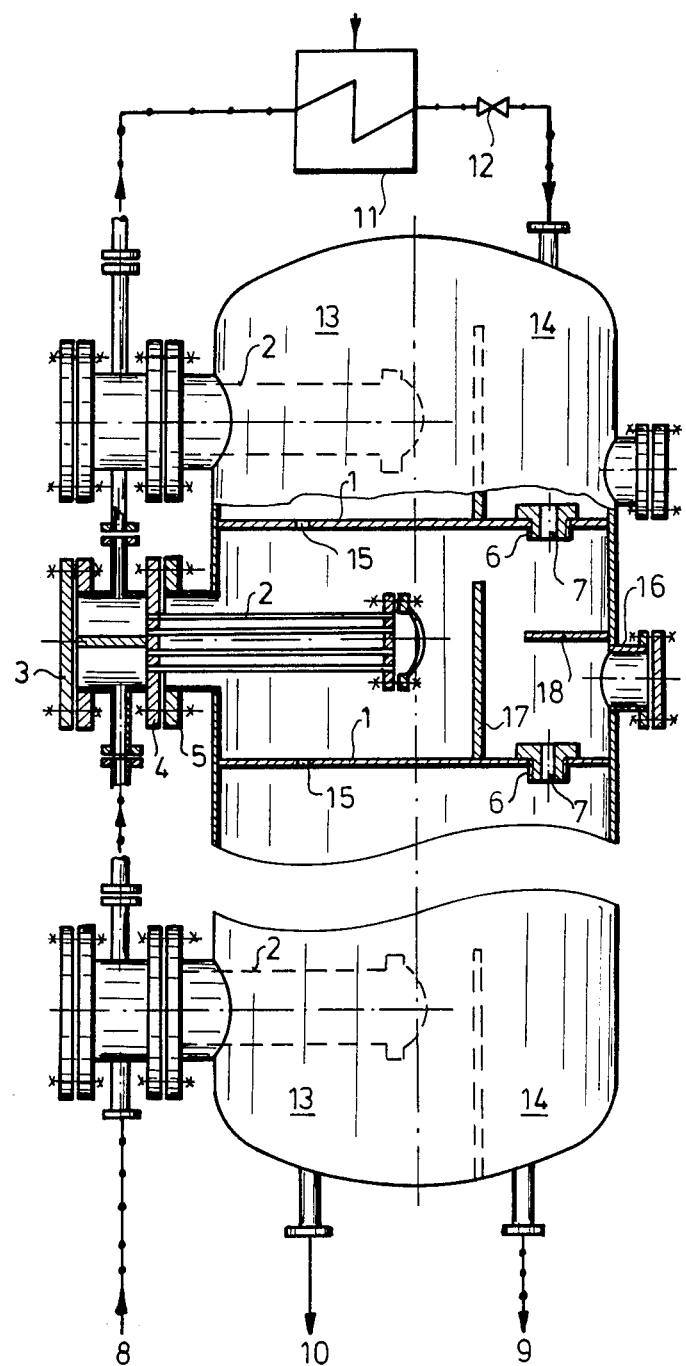

MULTISTAGE EVAPORATION BOILING EQUIPMENT

FIELD OF THE INVENTION

The subject matter of the invention is a multistage evaporation boiling equipment constructed in the form of a single unit.

BACKGROUND OF THE INVENTION

Boiling equipment is used mostly in the chemical industry, in the food industry, and in several fields of water economics. The boiling method achieves separation of solutions and of emulsions but claims a high demand on heat. With the boiling method, solutions can be separated into their components. Heat transfer will cause the solution solvent to evaporate leaving a more concentrated solution.

Boiling equipment and its mode of operation can be classified in two different ways. According to one classification there is "evaporation" and "steaming out" boiling equipment. The "evaporation" boiling equipment involves a method carried out at constant pressure with heat transfer occuring immediately after the evaporation of the solvent. With the "steaming out" boiling method, evaporation of the solvent is performed in two steps: in the first step by heat transfer wherein the solution is heated at a given pressure, thereafter in the next step, the solution is fed through a choke means into a space having a lower pressure. This pressure decrease simultaneously permits a portion of the solvent to evaporate and reduces the temperature of the solution. The "evaporation" method is also referred to in the literature as the "expansion process" or more prevalently as "flash-evaporation". The multistage evaporation is expressed in the literature as the "multiflash process."

The aim of boiling processes is mostly the recovery of dissolved material although solvent recovery is also frequently practiced. An example of the latter, for instance, is the desalinization of sea-water by boiling. With this process partly potable water, partly salt is recovered from sea-water.

A major problem with boiling processes is Sedimentation. Crystals derived from the boiler stones are delivered by and sedimented onto the wall of the equipment. This results in narrowing of passages within the vaporization column thereby impairing heat transfer effects. For this reason boiling equipment is preferably constructed in a way that permits cleaning to be carried out as easy as possible. The surfaces to be cleaned should, above all, be easily reachable to insure economic viability of the process.

A further major problem is the very high heat consumption of boiling processes in general and the evaporation and steaming methods in particular. In order to decrease the high heat consumption, recourse may be had to so-called multistage boiling. Theoretically, heat consumption decreases inversely with the number of stages. Practically speaking, however, the finite heat transferring surfaces decrease heat consumption to a lesser extent than that theoretically calculated.

Nonetheless, the multistage boiling approach has recently been incorporated into evaporation type boilers and achieved some success in decreasing heat losses. Again, practically speaking, this means that as many boilers are needed as there are number of stages. All this results in a decrease of heat consumption, but at a multifold increase in equipment capital costs.

Research has recently been undertaken to decrease these capital costs. One widely practiced solution has been to build stage evaporation boiling equipment in a single unit. Much of the expensive control means can thereby be eliminated. In the course of the new research, so called sandwich-units have been prepared as replacements for the single unit bodies. These sandwich units have been fixed by screw-locking into a single apparatus. Instead of regulating devices, fixed choke-means have been incorporated therein. The aforesaid approach has only superficially, but not in actuality, transformed the multistage evaporation boilers into a single unit. Capital costs of this approach are still very high. Moreover, this type equipment spawned other considerable problems.

One of these new problems was imperfect sealing caused by the need to screw-lock a number of different stages together. Even if all other segments of the equipment perform perfectly, seals as is well known will inevitably result in leakages, especially where there are a great number of seals. These leakages can easily ruin the operating economics of boiling equipment, especially that involving a vacuum. With multistage evaporation boiling methods at least part of the stages function under vacuum.

A new problem specific to the aforesaid equipment arises from the fact that plates instead of tubes are used because of space limitations as the heat transferring surfaces. Several draw-backs result from the use of plates. Though the heat transfer proportions and mechanical cleaning possibilities of the plates are more favorable than that of the tubes, plate construction itself is more complicated. Moreover, notwithstanding that mechanical cleaning of the plate equipment is easier, there is still a problem in trying to clean only small segments of the equipment. One can't simply dismantle a small area. Rather, it is necessary to disjoin large segments of the equipment. This is a long and costly procedure. Safety is also compromised by being forced to disconnect a large number of sealing parts.

A final problem should be mentioned. The choke-means, being used to replace the control means, are accessible only by taking apart the equipment. Separate choke-rows are necessary for vapor and liquid. Accordingly, replacing both choke-rows requires care to insure proper positioning. To achieve proper positioning it is the practice to have at least one row of the choke-means preformed in a special changeable construction for some of the units.

OBJECTS AND SUMMARY OF THE INVENTION

The object of our invention is to avoid the above mentioned problems and draw-backs, or at least to minimize them. Specifically, it is the object of our invention to considerably reduce equipment capital costs and to avoid sealing problems associated with the apparatus of the prior art.

According to the invention, our boiling equipment requires few seals. Cleaning the equipment of our invention requires no dismantling of seals. Therefore, disruption of the vacuum is minimized. The cleaning process can be carried out easily since the equipment employs tube type heat-exchangers having very favorable heat-transfer properties. A further object is to secure an easy exchangeability of the choke controls without dismantling the apparatus.

Our invention is based on the recognition that it is unnecessary for seals to separate the various stages from one another as in the prior art. Instead, the present invention employs seals which separate each stage heat exchanger from the body of the apparatus. This allows seals to be applied having a considerably smaller surface area. Consequently, when cleaning the apparatus only one seal must be loosened. Operational safety is thereby enhanced. In summary, when the necessary cleaning is to occur, the present invention does not require the loosening of seals and thereby protects the system vacuum.

The essence of our invention is that inside the apparatus the stages having different pressures are separated from each other by a selection wall. Further, in each stage one or more heat exchangers comprising a bundle of tubes is built into the stage. Moreover, with at least half of the aforesaid bundle of tube heat exchangers the cover can be dismantled.

BRIEF DESCRIPTION OF THE DRAWING

The equipment according to the invention will be explained by the attached drawing. It shows the apparatus in side-view where one stage of the apparatus is represented in section. This sectional representation shows all the essential elements comprising the features of our invention. The drawing shows but three stages. It is within the contemplation of this invention that many more stages can be applied.

SPECIFIC DESCRIPTION

A dotted line shows the path of material entering entrance pipe (8). The exit pipe (9) is shown with a dotted line representing the direction material exits from this equipment. The continuous line through exit pipe 10 shows the direction in which evaporated and subsequently condensated clean solvent departs the apparatus. The volume issuing from pipe (8) (mass-stream) is equal to the volumes (mass-streams) of the leaving volumes feeding into pipes (9) and (10). The dissolved material—in form of a concentrated solution exits only at exit pipe (9).

The highest pressure is found in the highest stage; as one descends down the stages the pressure decrease concomitantly. In the lower stages there is a substantial vacuum. The base-solution enters through entrance pipe (8) and streams from below upwards through several heat-exchangers (2) of the tube bundle type. The base solution achieves a higher and higher temperature as it passes through each heat exchanger (2) of the tube bundle type because in each of the stages newly condensed solvent volume gets evaporated. The vapor then condenses as an enriched solution on the outer wall of the tubes of the heat-exchangers (2) where the condensated base solution reheats the enriched solution.

The pump circulating the enriched solution eventually creates such a high pressure that the enriched dilute solution cannot be evaporated even in the heat exchanger (11). The enriched dilute solution attains its highest temperature in the heat exchanger. The heating heat exchanger (11) is the single place where a heat transfer from outside occurs. This is also the place in the multistage evaporation boiling equipment where enrichment is completed. The enriched solution then streams from the heating heat exchanger (11) through the outer choke-means (12). Thereafter the pressure decreases to a value corresponding to that in the first stage. As a consequence of the pressure drop, a part of the solvent evaporates and recondenses back into the liquid phase on the outer wall of the heat exchanger (2), losing its latent heat. In the heating heat exchanger (11) only such volume of heat (steam) is transferred which is needed for the first stage evaporation. Evaporation in the lower stages is achieved by pressure differences between the stages so that the evaporated solvent of each stage can be condensated through the heat exchanger (2) which heats the enriched solution streaming upwards. It can be seen in the left-side space (13) of the stages, how solvent condensation gathers stage-by-stage. In the right-side space (14) of the stages the stream flows downward with even more concentration of the solution as volume decreases. Finally, the material exits from the last stage in the form of a concentrated solution product.

It can be seen by the drawing that between each of the stages, the inner choke means (7,15) are placed in the separating wall (1). The rows of choke means secure the feeding of the necessary volume of the solution. The inner-choke means are uniformly dimensioned openings so as to thereby be exchangeable and constructed in the form of screw locking means. The possibility that openings may be changed renders easy the control of the operation of the apparatus including altering the product output. The drawing, as but one example, illustrates only a single changeable choke-means row identified as choke-means (7) for feeding the solution. Choke-means (7) may be fixed by screwing into opening (6). The aforesaid allows easy setting into operation of the equipment but it does not permit modification of product output because the opening of the inner choke-means (15) feeding the solvent has a fixed rather than changeable diameter. Possibility of the easy change of said inner choke-means (7) enables the pipe-stub (16) main welded onto the equipment to be supplied with a detachable cover.

Heat exchanger (2) applied to each stage, has two outer connections which are detachable and fitted with the seals. One connection utilizes a flange (5) welded onto the apparatus tube wall through which the heat exchanger (2) is attached by means of a screw-locking mechanism for sealing. This connection enables the mounting in and out of the whole heat exchanger (2) with its bundle of tubes to allow inspection of the equipment and of the heat exchanger itself. The seal provided by this connection separates the inner stages of the equipment from the outer environment. At least half of the stages depend on these seals for maintaining vacuum. Consequently, this sealing must be carried out with special care and the seal must have durability.

The other connection is the outer one identified as cover (3) of the heat exchanger 2. As with flange (5), cover (2) is secured by a screw-locking mechanism. When it becomes necessary to clean the apparatus, only cover (2) need be removed.

Partitions (17) positioned in each of the stages, separate the left side space (13) containing the solvent from the right side space (14) containing the concentrated solution. Thereby, the mixing of the tube media is hindered. Baffle plate (18) serves to intercept the solvent as it streams at high speed through the inner choke-means (7).

The most important advantage of the equipment according to the invention is that the stages are not composed of sandwich-sheets. This means the equipment is actually one of single-body construction. Capital costs are considerably lower than similar constructions belonging to the prior art. A further very important advantage is that sealing problems are avoided thereby improving operational safety and economic efficiency. A further advantage is that segments of the apparatus can be cleaned in a very simple way while retaining vacuum in the remaining parts of the apparatus. A further advantage is that the choke-means can be changed very easily.

We claim:

1. A multistage evaporation boiling equipment in the form of a single unit, each stage having a different pressure, comprising:

two or more heat exchanger units, each having a bundle of tubes which provide a heat exchanging surface, each of said units sealingly inserted parallel to one another at different points along a length of a central column through which a liquid may pass by condensing and vaporizing;

one or more separating walls attached inside said column and separating at least one heat exchanger unit from another;

an opening in said separating wall for permitting passage of a vapor of said liquid from one stage to another;

a choke means within said opening for restricting the size of said opening and thereby controlling the amount of vapor passing therethrough;

at least half of said heat exchangers having a portion of the exchanger protruding outward from a wall of said column;

a flange attached to said portion of said heat exchanger protruding from said column;

an outer tube wall joining with said flange to form a seal; and a passageway connecting said outer tube wall to a cover providing a second seal, both of said seals being detachable to permit the removal of said heat exchanger with its bundle of tubes from said column.

2. A multistage evaporation boiling equipment according to claim 1 further comprising partitions positioned in one or more of the stages, said partitions attached perpendicular to said separating walls.

3. A multistage evaporation boiling equipment according to claim 1 further comprising baffle plates parallel to said separating walls.

4. A multistage evaporation boiling equipment according to claim 3 wherein said baffle plates are positioned over said openings in said separating wall.

* * * * *